(12) United States Patent
Lee et al.

(10) Patent No.: US 11,263,722 B2
(45) Date of Patent: Mar. 1, 2022

(54) VIDEO PROCESSING METHOD FOR REMAPPING SAMPLE LOCATIONS IN PROJECTION-BASED FRAME WITH HEMISPHERE CUBEMAP PROJECTION LAYOUT TO LOCATIONS ON SPHERE AND ASSOCIATED VIDEO PROCESSING APPARATUS

(71) Applicant: MEDIATEK INC., Hsin-Chu (TW)

(72) Inventors: Ya-Hsuan Lee, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/143,164

(22) Filed: Jan. 7, 2021

(65) Prior Publication Data

US 2021/0398245 A1 Dec. 23, 2021

Related U.S. Application Data

(60) Provisional application No. 63/072,278, filed on Aug. 31, 2020, provisional application No. 63/037,063, filed on Jun. 10, 2020.

(51) Int. Cl.
*G06T 3/00* (2006.01)
*G06T 3/60* (2006.01)
*H04N 13/161* (2018.01)

(52) U.S. Cl.
CPC .......... *G06T 3/0087* (2013.01); *G06T 3/0062* (2013.01); *G06T 3/60* (2013.01); *H04N 13/161* (2018.05)

(58) Field of Classification Search
None
See application file for complete search history.

(56) References Cited

U.S. PATENT DOCUMENTS 10,467,775 B1    11/2019  Waggoner
2018/0268516 A1*  9/2018  Coban ................... H04N 19/85

FOREIGN PATENT DOCUMENTS

CN    109429561 A    3/2019
CN    110249626 A    9/2019

OTHER PUBLICATIONS

"International Search Report" dated Apr. 21, 2021 for International application No. PCT/CN2021/074297, International filing date:Jan. 29, 2021.

* cited by examiner

*Primary Examiner* — Christopher Braniff
(74) *Attorney, Agent, or Firm* — Winston Hsu

(57) ABSTRACT

A video processing method includes: decoding a part of a bitstream to generate a decoded frame, where the decoded frame is a projection-based frame that includes projection faces in a hemisphere cubemap projection layout; and remapping sample locations of the projection-based frame to locations on the sphere, where a sample location within the projection-based frame is converted into a local sample location within a projection face packed in the projection-based frame; in response to adjustment criteria being met, an adjusted local sample location within the projection face is generated by applying adjustment to one coordinate value of the local sample location within the projection face, and the adjusted local sample location within the projection face is remapped to a location on the sphere; and in response to the adjustment criteria not being met, the local sample location within the projection face is remapped to a location on the sphere.

20 Claims, 12 Drawing Sheets

| gcmp_packing_type | gcmp_guard_band_boundary_exterior_flag | Location of guard band |
|---|---|---|
| 0 | 0 | |
| 0 | 1 | |

FIG. 4

| gcmp_packing_type | gcmp_guard_band_boundary_exterior_flag | Location of guard band |
|---|---|---|
| 1 | 0 | |
| 1 | 1 | |
| 2 | 0 | |
| 2 | 1 | |
| 3 | 0 | |
| 3 | 1 | |

FIG.5

| gcmp_packing_type | gcmp_guard_band_boundary_exterior_flag | Location of guard band |
|---|---|---|
| 4 | 0 | |
| 4 | 1 | ![](0\|1\|2\|3\|4 with exterior) |
| 5 | 0 | ![](vertical 0-4) |
| 5 | 1 | ![](vertical 0-4 with exterior) |

Hemisphere cubemap projection

FIG. 6

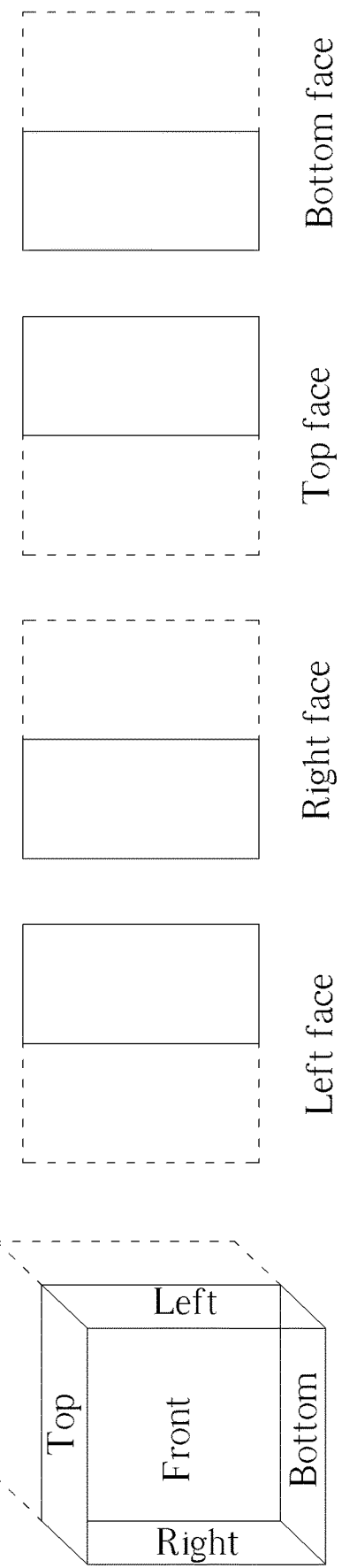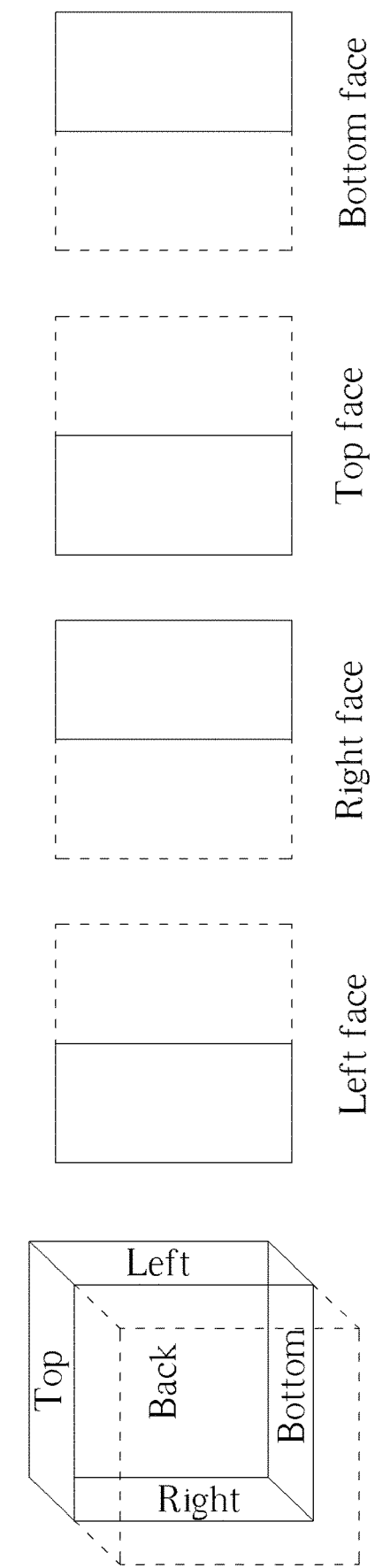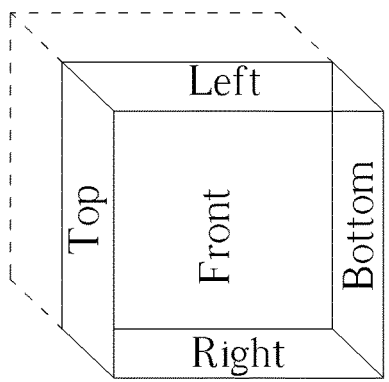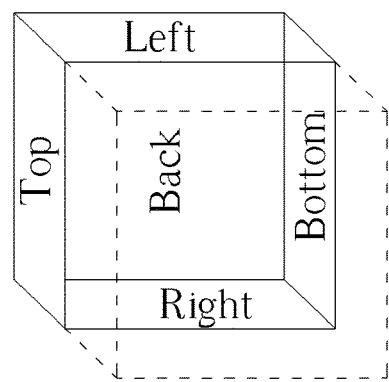
FIG. 9
FIG. 10

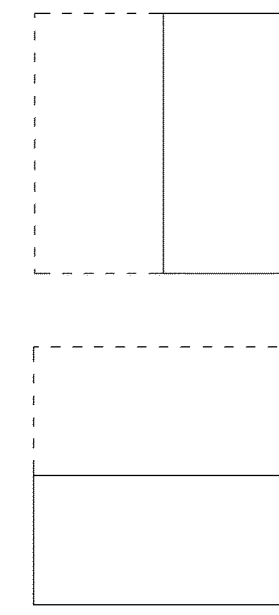
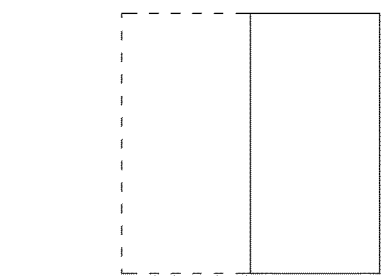
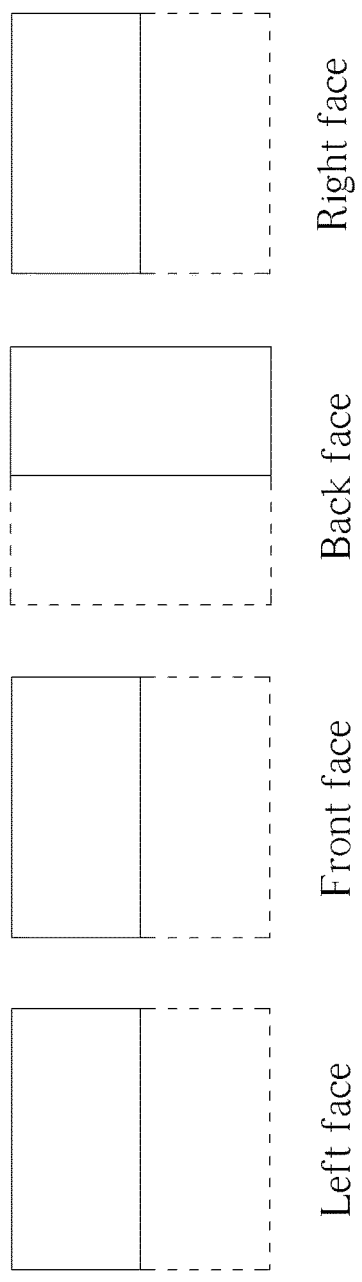
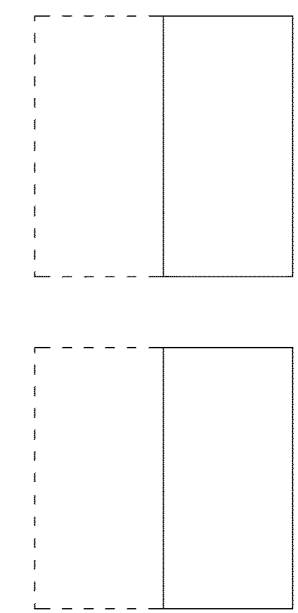
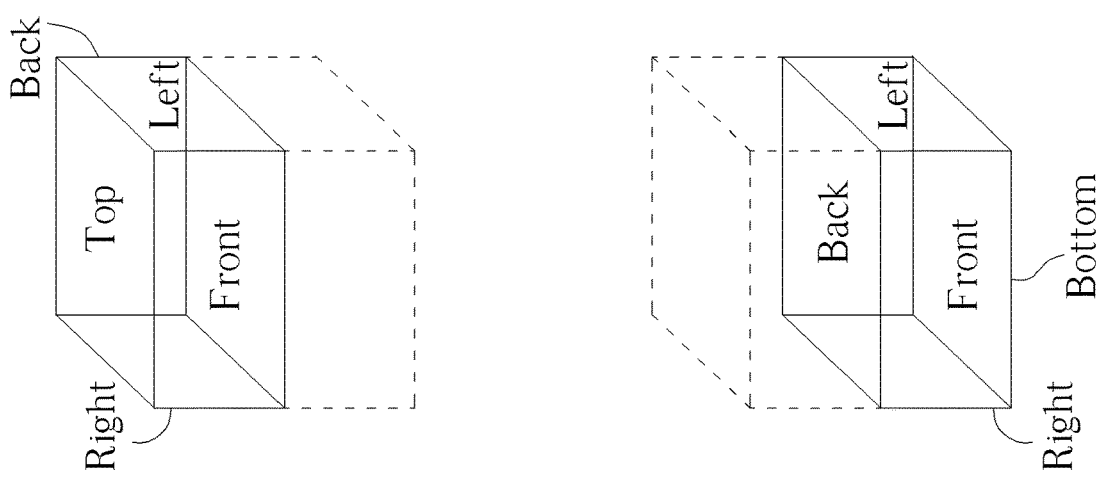
FIG. 13
FIG. 14

VIDEO PROCESSING METHOD FOR REMAPPING SAMPLE LOCATIONS IN PROJECTION-BASED FRAME WITH HEMISPHERE CUBEMAP PROJECTION LAYOUT TO LOCATIONS ON SPHERE AND ASSOCIATED VIDEO PROCESSING APPARATUS

CROSS REFERENCE TO RELATED APPLICATIONS

This application claims the benefit of U.S. provisional application No. 63/037,063 filed on Jun. 10, 2020 and U.S. provisional application No. 63/072,278 filed on Aug. 31, 2020. The entire contents of related applications, including U.S. provisional application No. 63/037,063 and U.S. provisional application No. 63/072,278, are incorporated herein by reference.

BACKGROUND

The present invention relates to video processing, and more particularly, to a video processing method for remapping sample locations in a projection-based frame with a hemisphere cubemap projection layout to locations on a sphere and an associated video processing apparatus.

Virtual reality (VR) with head-mounted displays (HMDs) is associated with a variety of applications. The ability to show wide field of view content to a user can be used to provide immersive visual experiences. A real-world environment has to be captured in all directions, resulting in an omnidirectional video corresponding to a viewing sphere. With advances in camera rigs and HMDs, the delivery of VR content may soon become the bottleneck due to the high bitrate required for representing such a 360-degree content. When the resolution of the omnidirectional video is 4K or higher, data compression/encoding is critical to bitrate reduction.

In general, the omnidirectional video corresponding to a sphere is transformed into a frame with a 360-degree image content represented by one or more projection faces arranged in a 360-degree Virtual Reality (360 VR) projection layout, and then the resulting frame is encoded into a bitstream for transmission. The bitstream generated from an encoder side is received and decoded by a decoder side. In addition, a configuration of the employed 360 VR projection layout may also be signaled from the encoder side to the decoder side. There is a need for an innovative design that can enable the decoder-side rendering process and post-processing process to use the signaled frame layout information for correctly remapping sample locations in the projection-based frame on a two-dimensional (2D) plane to locations on the sphere in a three-dimensional (3D) space.

SUMMARY

One of the objectives of the claimed invention is to provide a video processing method for remapping sample locations in a projection-based frame with a hemisphere cubemap projection layout to locations on a sphere and an associated video processing apparatus.

According to a first aspect of the present invention, an exemplary video processing method is disclosed. The exemplary video processing method includes: decoding a part of a bitstream to generate a decoded frame, wherein the decoded frame is a projection-based frame that comprises a plurality of projection faces in a hemisphere cubemap projection layout, and a portion of a 360-degree content of a sphere is mapped to the plurality of projection faces via hemisphere cubemap projection; and remapping, by a conversion circuit, sample locations of the projection-based frame on a two-dimensional (2D) plane to locations on the sphere in a three-dimensional (3D) space, wherein a sample location within the projection-based frame is converted into a local sample location within a projection face packed in the projection-based frame; the local sample location within the projection face comprises a first coordinate value on a first axis and a second coordinate value on a second axis; in response to adjustment criteria being met, a local adjusted sample location within the projection face is generated by applying adjustment to one of the first coordinate value and the second coordinate value of the local sample location within the projection face, and the adjusted local sample location within the projection face is remapped to a location on the sphere; and in response to the adjustment criteria not being met, the local sample location within the projection face is remapped to a location on the sphere.

According to a second aspect of the present invention, an exemplary video processing apparatus is disclosed. The exemplary video processing apparatus includes a decoding circuit and a conversion circuit. The decoding circuit is arranged to decode a part of a bitstream to generate a decoded frame, wherein the decoded frame is a projection-based frame that comprises a plurality of projection faces in a hemisphere cubemap projection layout, and a portion of a 360-degree content of a sphere is mapped to the plurality of projection faces via hemisphere cubemap projection. The conversion circuit is arranged to remap sample locations of the projection-based frame on a two-dimensional (2D) plane to locations on the sphere in a three-dimensional (3D) space. The conversion circuit converts a sample location within the projection-based frame into a local sample location within a projection face packed in the projection-based frame, where the local sample location within the projection face comprises a first coordinate value on a first axis and a second coordinate value on a second axis. The conversion circuit checks if adjustment criteria are met. In response to the adjustment criteria being met, the conversion circuit generates an adjusted local sample location within the projection face by applying adjustment to one of the first coordinate value and the second coordinate value of the local sample location within the projection face, and remaps the adjusted local sample location within the projection face to a location on the sphere. In response to the adjustment criteria not being met, the conversion circuit remaps the local sample location within the projection face to a location on the sphere.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4-6 are diagrams illustrating one specification of a combination of two syntax elements gcmp_packing_type and gcmp_guard_band_boundary_exterior_flag according to an embodiment of the present invention.

FIG. 9 is a diagram illustrating an example of four half faces selected for the hemisphere CMP layout under a condition that the front face is selected as the full face.

FIG. 10 is a diagram illustrating an example of four half faces selected for the hemisphere CMP layout under a condition that the back face is selected as the full face.

FIG. 13 is a diagram illustrating an example of four half faces selected for the hemisphere CMP layout under a condition that the top face is selected as the full face.

FIG. 14 is a diagram illustrating an example of four half faces selected for the hemisphere CMP layout under a condition that the bottom face is selected as the full face.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
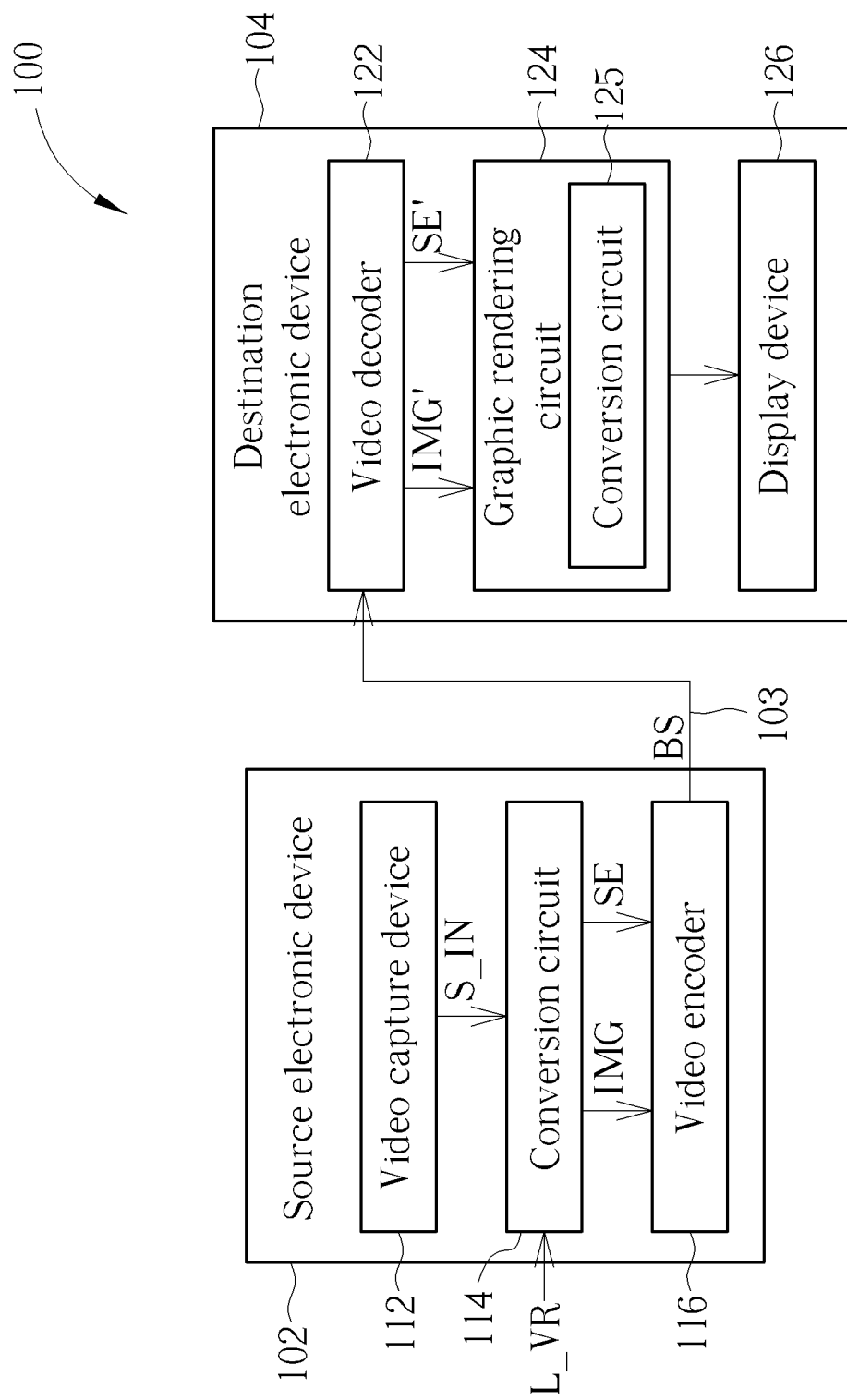
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be an omnidirectional camera. The conversion circuit 114 generates a projection-based frame IMG with a 360-degree Virtual Reality (360 VR) projection layout L_VR according to an omnidirectional video frame S_IN corresponding to a sphere, where the omnidirectional video frame S_IN contains a 360-degree content of the sphere. The video encoder 116 is an encoding circuit that encodes the projection-based frame IMG (which has projection face(s) packed in the 360 VR projection layout L_VR) to generate a part of a bitstream BS, and outputs the bitstream BS to the destination electronic device 104 via a transmission means 103 such as a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit that receives the bitstream BS from the transmission means 103 (e.g., wired/wireless communication link or storage medium), and decodes a part of the received bitstream BS to generate a decoded frame IMG'. In this embodiment, the projection-based frame IMG to be encoded by the video encoder 116 has a 360 VR projection layout L_VR. Hence, after a part of the bitstream BS is decoded by the video decoder 122, the decoded frame (i.e., reconstructed frame) IMG' has the same 360 VR projection layout L_VR. In other words, the decoded frame IMG' is also a projection-based frame that has projection face(s) packed in the 360 VR projection layout L_VR. In the following, the terms "decoded frame" and "projection-based frame" may be interchangeable. The graphic rendering circuit 124 is arranged to drive the display device 126 to show an image content of a viewport area selected by a user. The graphic rendering circuit 124 may include a conversion circuit 125 that is arranged to perform a 2D-to-3D remapping process which remaps sample locations in a projection-based frame (i.e., decoded frame IMG') on a 2D plane to locations on the sphere in a 3D space. With the help of the conversion circuit 125, the graphic rendering circuit 124 can process a portion of the image content carried by the decoded frame IMG' for obtaining pixel data associated with the image content of the selected viewport area.

In this embodiment, the 360 VR projection layout L_VR may be a cube-based projection layout. Hence, at least a portion (i.e., part or all) of a 360-degree content of a sphere is mapped to projection faces via cube-based projection, and the projection faces derived from different faces of a three-dimensional object (e.g., a full cube or a half of a cube) are packed in the two-dimensional cube-based projection layout that is employed by the projection-based frame IMG/decoded frame IMG'.

Figure 2:
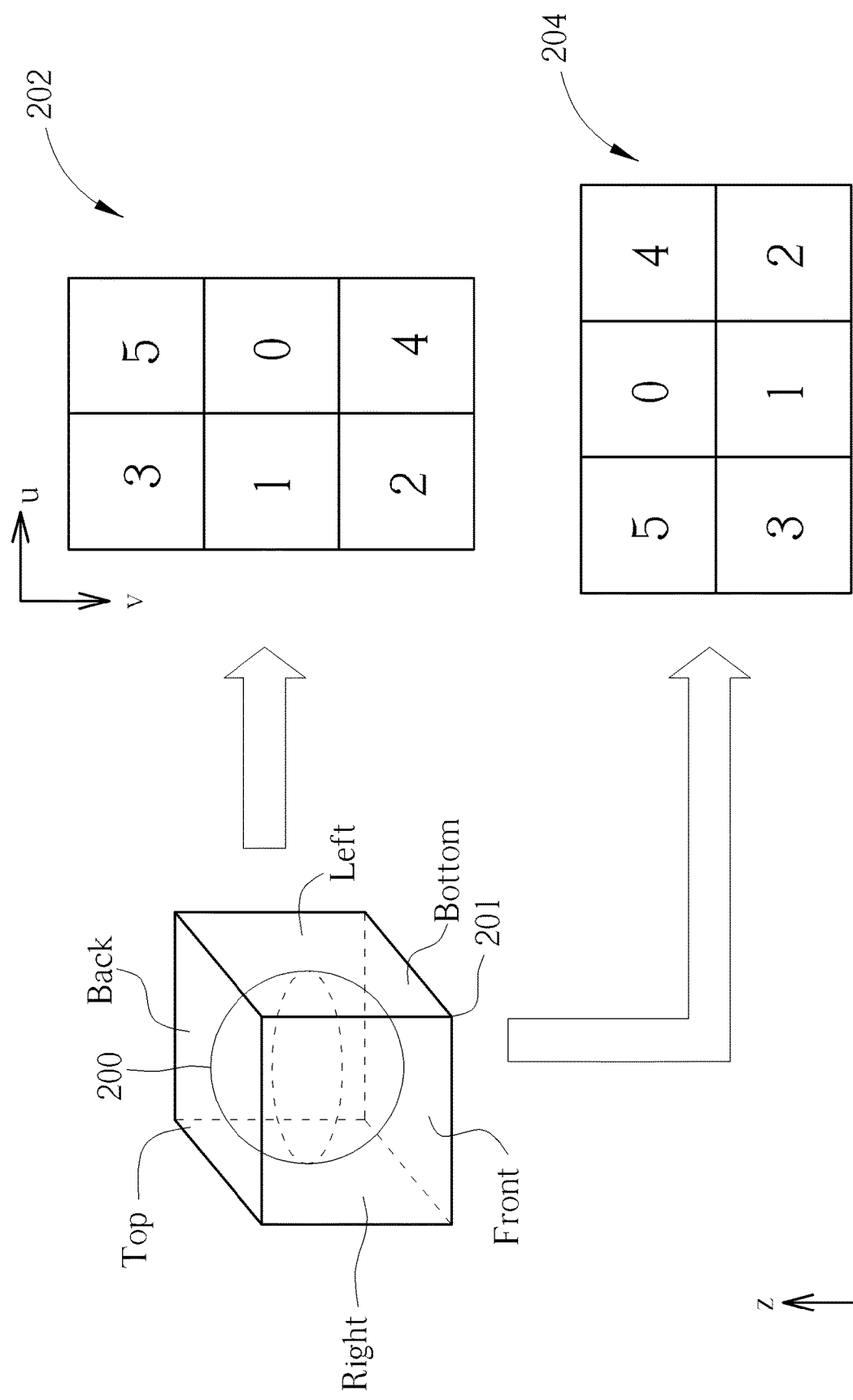
FIG. 2 is a diagram illustrating a cubemap projection (CMP) according to an embodiment of the present invention.

For example, cube-based projection with six square projection faces representing full 360°×180° omnidirectional video (i.e., all of a 360-degree content of a sphere) may be employed. Regarding the conversion circuit 114 of the source electronic device 102, cube-based projection is employed to generate square projection faces of a cube in a 3D space. FIG. 2 is a diagram illustrating a cubemap projection (CMP) according to an embodiment of the present invention. The whole 360-degree content on the sphere 200 is projected onto six square faces of a cube 201, including a top face (labeled by "Top"), a bottom face (labeled by "Bottom"), a left face (labeled by "Left"), a front face (labeled by "Front"), a right face (labeled by "Right"), and a back face (labeled by "Back"). As shown in FIG. 2, an image content of a north polar region of the sphere 200 is projected onto the top face "Top", an image content of a south polar region of the sphere 200 is projected onto the bottom face "Bottom", and an image content of an equatorial region of the sphere 200 is projected onto the left face "Left", the front face "Front", the right face "Right", and the back face "Back".

In the 3D space that is defined by x-axis, y-axis, and z-axis, each point on six projected faces is located at (x, y, z), where x,y,z∈[−1,1]. In this example shown in FIG. 2, the front face "Front" is on an x-plane with x=1, the back face "Back" is on an x-plane with x=−1, the top face "Top" is on a z-plane with z=1, the bottom face "Bottom" is on a z-plane with z=−1, the left face "Left" is on a y-plane with y=1, and the right face "Right" is on a y-plane with y=−1. In an alternative design, the front face "Front" may be on an x-plane with x=1, the back face "Back" may be on an x-plane with x=−1, the top face "Top" may be on a y-plane with y=1, the bottom face "Bottom" may be on a y-plane with y=−1, the right face "Right" may be on a z-plane with z=1, and the left face "Left" may be on a z-plane with z=−1.

Forward transformation can be used to transform from the 3D space (x, y, z) to the 2D plane (u, v). Hence, the top face "Top", bottom face "Bottom", left face "Left", front face "Front", right face "Right", and back face "Back" of the cube 201 in the 3D space are transformed into a top face (labeled by "2"), a bottom face (labeled by "3"), a left face (labeled by "5"), a front face (labeled by "0"), a right face (labeled by "4"), and a back face (labeled by "1") on the 2D plane. Each face is on one 2D plane defined by u-axis in a horizontal direction and v-axis in a vertical direction, and has each point located at (u, v).

Inverse transformation can be used to transform from the 2D plane (u, v) to the 3D space (x, y, z). Hence, the top face (labeled by "2"), the bottom face (labeled by "3"), the left face (labeled by "5"), the front face (labeled by "0"), the right face (labeled by "4"), and the back face (labeled by "1") on the 2D plane can be transformed into the top face "Top", bottom face "Bottom", left face "Left", front face "Front", right face "Right", and back face "Back" of the cube 201 in the 3D space.

The inverse transformation can be employed by the conversion circuit 114 of the source electronic device 102 for generating the top face "2", bottom face "3", left face "5", front face "0", right face "4", and back face "1". The top face "2", bottom face "3", left face "5", front face "0", right face "4", and back face "1" on the 2D plane are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR (e.g., CMP layout) adopted at the encoder side. Regarding the conversion circuit 125 of the destination electronic device 104, forward transformation may be used to transform from the 3D space (x, y, z) to the 2D plane (u, v) for determining pixel values of pixels in any of the top face "Top", bottom face "Bottom", left face "Left", front face "Front", right face "Right", and back face "Back". Or the inverse transformation may be used by the conversion circuit 125 to transform from the 2D plane (u, v) to the 3D space (x, y, z) for remapping the sample locations of the projection-based frame (i.e., decoded frame IMG') to the sphere 200.

As mentioned above, the top face "2", bottom face "3", left face "5", front face "0", right face "4", and back face "1" are packed to form the projection-based frame IMG. For example, the conversion circuit 114 may select one packing type, such that the projection-based frame IMG may have projected image data arranged in the cube-based projection layout (CMP layout) 202. For another example, the conversion circuit 114 may select another packing type, such that the projection-based frame IMG may have projected image data arranged in the cube-based projection layout (CMP layout) 204 that is different from the cube-based projection layout 202.

Figure 3:
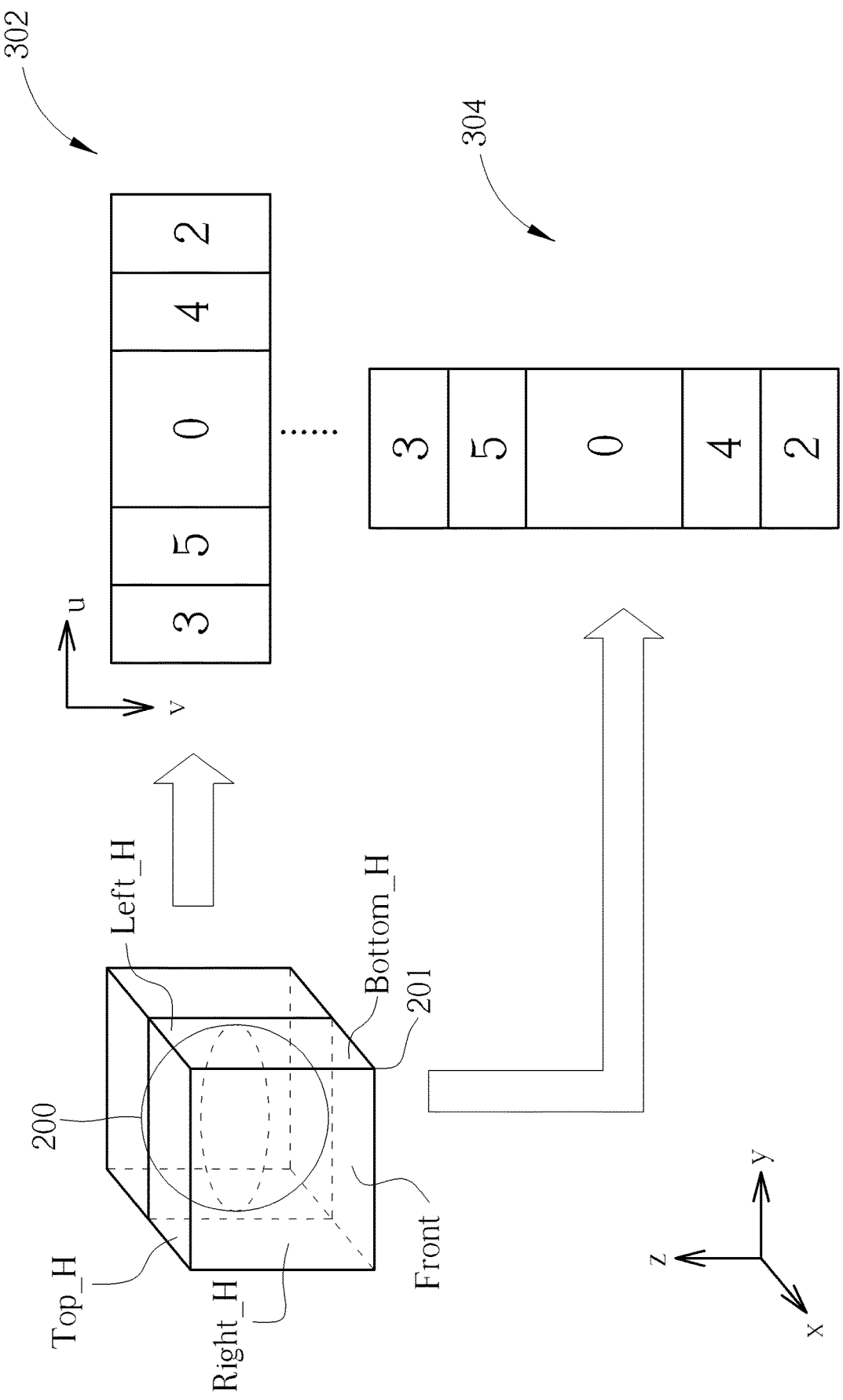
FIG. 3 is a diagram illustrating a hemisphere cubemap projection according to an embodiment of the present invention.

For another example, cube-based projection with five projection faces (which include one full face and four half faces) representing 180°×180° omnidirectional video (i.e., only a part of a 360-degree content of a sphere) may be employed. Regarding the conversion circuit 114 of the source electronic device 102, cube-based projection is employed to generate one full face and four half faces of a cube in a 3D space. FIG. 3 is a diagram illustrating a hemisphere cubemap projection according to an embodiment of the present invention. Only a half of the 360-degree content on the sphere 200 is projected onto faces of a cube 201, including a top half face (labeled by "Top_H"), a bottom half face (labeled by "Bottom_H"), a left half face (labeled by "Left_H"), a front full face (labeled by "Front"), and a right half face (labeled by "Right_H"). In this example, a half of the cube 201 is employed for hemisphere cubemap projection, where a hemisphere (e.g., a half of the sphere 200) is inscribed in the half of the cube 201. As shown in FIG. 3, an image content of a half of a north polar region of the sphere 200 is projected onto the top half face "Top_H", an image content of a half of a south polar region of the sphere 200 is projected onto the bottom half face "Bottom_H", and an image content of a half of an equatorial region of the sphere 200 is projected onto the left half face "Left_H", the front full face "Front", and the right half face "Right_H".

In the 3D space that is defined by x-axis, y-axis, and z-axis, each point on five projected faces is located at (x, y, z), where x,y,z∈[−1,1]. In this example shown in FIG. 3, the front full face "Front" is on an x-plane with x=1, the top half face "Top_H" is on a z-plane with z=1, the bottom half face "Bottom_H" is on a z-plane with z=−1, the left half face "Left_H" is on a y-plane with y=1, and the right half face "Right_H" is on a y-plane with y=−1. In an alternative design, the front full face "Front" may be on an x-plane with x=1, the top half face "Top_H" may be on a y-plane with y=1, the bottom half face "Bottom_H" may be on a y-plane with y=−1, the right half face "Right_H" may be on a z-plane with z=1, and the left half face "Left_H" may be on a z-plane with z=−1.

Forward transformation can be used to transform from the 3D space (x, y, z) to the 2D plane (u, v). Hence, the top half face "Top_H", bottom half face "Bottom_H", left half face "Left_H", front full face "Front", and right half face "Right_H" of the cube 201 in the 3D space are transformed into a top half face (labeled by "2"), a bottom half face (labeled by "3"), a left half face (labeled by "5"), a front full face (labeled by "0"), and a right half face (labeled by "4") on the 2D plane. Each face is on one 2D plane defined by u-axis in a horizontal direction and v-axis in a vertical direction, and has each point located at (u, v). In addition, a size of the front full face (labeled by "0") is twice as large as a size of each of top half face (labeled by "2"), bottom half face (labeled by "3"), left half face (labeled by "5"), and right half face (labeled by "4").

Inverse transformation can be used to transform from the 2D plane (u, v) to the 3D space (x, y, z). Hence, the top half face (labeled by "2"), the bottom half face (labeled by "3"), the left half face (labeled by "5"), the front full face (labeled by "0"), and the right half face (labeled by "4") on the 2D plane can be transformed into the top half face "Top_H", bottom half face "Bottom_H", left half face "Left_H", front full face "Front", and right half face "Right_H" of the cube 201 in the 3D space.

The inverse transformation can be employed by the conversion circuit 114 of the source electronic device 102 for generating the top half face "2", bottom half face "3", left half face "5", front full face "0", and right half face "4". The top half face "2", bottom half face "3", left half face "5", front full face "0", and right half face "4" on the 2D plane are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR (e.g., hemisphere CMP layout) adopted at the encoder side. Regarding the conversion circuit 125 of the destination electronic device 104, forward transformation may be used to transform from the 3D space (x, y, z) to the 2D plane (u, v) for determining pixel values of pixels in any of the top half face "Top_H", bottom half face "Bottom_H", left half face "Left_H", front full face "Front", and right half face "Right_H". Or the inverse transformation may be used by the conversion circuit 125 to transform from the 2D plane (u, v) to the 3D space (x, y, z) for remapping the sample locations of the projection-based frame (i.e., decoded frame IMG') to the sphere 200.

As mentioned above, the top half face "2", bottom half face "3", left half face "5", front full face "0", and right half face "4" are packed to form the projection-based frame IMG. For example, the conversion circuit 114 may select one packing type, such that the projection-based frame IMG may have projected image data arranged in the cube-based projection layout (hemisphere CMP layout) 302. For another example, the conversion circuit 114 may select another packing type, such that the projection-based frame IMG may have projected image data arranged in the cube-based projection layout (hemisphere CMP layout) 304 that is different from the cube-based projection layout 302. In this embodiment, the front face is selected as the full face that is packed in the cube-based projection layout 302/304. In practice, the full face packed in the cube-based projection layout 302/304 may be any of the top face, the bottom face, the front face, the back face, the left face, and the right face, and the four half faces packed in the cube-based projection layout 302/304 depend on the selection of the full face.

Regarding the embodiment shown in FIG. 2, projection faces are packed in a regular CMP layout without guard bands (or padding) 202/204. Regarding the embodiment shown in FIG. 3, projection faces are packed in a hemisphere CMP layout without guard bands (or padding) 302/304. However, the projection-based frame IMG after coding may have artifacts due to discontinuous layout boundaries of the CMP layout (which may be a regular CMP layout or a hemisphere CMP layout) and/or discontinuous face edges of the CMP layout (which may be a regular CMP layout or a hemisphere CMP layout). For example, the CMP layout without guard bands (or padding) has a top discontinuous layout boundary, a bottom discontinuous layout boundary, a left discontinuous layout boundary, and a right discontinuous layout boundary. In addition, there is at least one image content discontinuous edge between two adjacent projection faces packed in the CMP layout without guard bands (or padding). Taking the cube-based projection layout 202/204 for example, one discontinuous edge exists between one face boundary of the bottom face "3" and one face boundary of the left face "5", one discontinuous edge exists between one face boundary of the back face "1" and one face boundary of the front face "0", and one discontinuous edge exists between one face boundary of the top face "2" and one face boundary of the right face "4". Taking the cube-based projection layout 302/304 for example, one discontinuous edge exists between one face boundary of the bottom face "3" and one face boundary of the left face "5", and one discontinuous edge exists between one face boundary of the right face "4" and one face boundary of the top face "2".

To address this issue, the 360 VR projection layout L_VR may be set by a cube-based projection layout with guard bands (or padding). For example, around layout boundaries and/or discontinuous face edges, additional guard bands generated by, for example, pixel padding may be inserted for reducing the seam artifacts. Alternatively, around layout boundaries and/or continuous face edges, additional guard bands generated by, for example, pixel padding may be inserted.

In some embodiments, the conversion circuit 114 can determine a guard band configuration of the projection-based frame IMG that consists of projection faces derived from cube-based projection (e.g., regular cubemap projection shown in FIG. 2 or hemisphere cubemap projection shown in FIG. 3), and the video encoder 116 can signal syntax element(s) SE via the bitstream BS. For example, the syntax element(s) SE may be associated with packing of the projection faces in the projection-based frame IMG and the guard band configuration of the projection-based frame IMG. Hence, the video decoder 122 can parse the syntax element(s) SE' associated with the packing configuration of the projection faces in the projection-based frame IMG and the guard band configuration of the projection-based frame IMG from the bitstream BS, and can provide the graphic rendering circuit 124 (particularly, conversion circuit 125) with the parsed syntax element(s) SE', such that the graphic rendering circuit 124 (particularly, conversion circuit 125) is informed of the configuration information of face packing and the configuration information of guard bands. It should be noted that the projection-based frame IMG and the decoded frame IMG' have the same configuration of face packing and the same configuration of guard bands. In this way, when determining an image content of a viewport area selected by a user, the graphic rendering circuit 124 (particularly, conversion circuit 125) can refer to the configuration information of face packing and the configuration information of guard bands to correctly perform 2D-to-3D sample location remapping. Ideally, syntax element(s) SE encoded into the bitstream BS by the video encoder 116 are the same as the syntax element(s) SE' parsed from the bitstream BS by the video decoder 122. For example, syntax element(s) SE/SE' indicative of configuration of face packing may include gcmp_packing_type, gcmp_face_rotation, gcmp_face_index, etc.; and syntax element(s) SE/SE' indicative of configuration of guard bands may include gcmp_guard_band_flag, gcmp_guard_band_boundary_exterior_flag, gcmp_guard_band_samples_minus1, etc.

The syntax element gcmp_guard_band_flag is arranged to indicate whether a projection-based frame (e.g., IMG or IMG') contains at least one guard band. If the syntax element gcmp_guard_band_flag is equal to 0, it indicates that the coded picture does not contain guard band areas. If the syntax element gcmp_guard_band_flag is equal to 1, it indicates that the coded picture contains guard band area(s) for which the size(s) are specified by the syntax element gcmp_guard_band_samples_minus1.

The syntax element gcmp_guard_band_boundary_exterior_flag is arranged to indicate whether guard bands packed in the projection-based frame (e.g., IMG or IMG') include guard bands that act as boundaries of the cube-based projection layout.

The syntax element gcmp_guard_band_samples_minus1 is arranged to provide size information of each guard band packed in the projection-based frame (e.g., IMG or IMG'). For example, gcmp_guard_band_samples_minus1 plus 1 specifies the number of guard band samples, in units of luma samples, used in the cubemap projected picture. When the parameter ChromaFormatIdc is equal to 1 (4:2:0 chroma format) or 2 (4:2:2 chroma format), gcmp_guard_band_samples_minus1 plus 1 shall correspond to an even number of luma samples. That is, when the 4:2:0 chroma format or 4:2:2 chroma format is used, gcmp_guard_band_samples_minus1 plus 1 shall correspond to an even number of luma samples.

FIGS. 4-6 are diagrams illustrating one specification of a combination of two syntax elements gcmp_packing_type and gcmp_guard_band_boundary_exterior_flag according to an embodiment of the present invention. In this example, the syntax element gcmp_packing_type specifies a packing type of packing of projection faces in a cube-based projection layout, and further specifies a pre-defined arrangement of position indexes assigned to face positions under the selected packing type. When the value of gcmp_packing_type is in the range of 0 to 3, inclusive, regular cubemap packing with six faces is used, where each packing type is associated with six face positions assigned with position indexes {0, 1, 2, 3, 4, 5}, respectively. When gcmp_packing_type is 4 or 5, hemisphere cubemap packing with one full face and four half faces is used, where each packing type is associated with five face positions assigned with position indexes {0, 1, 2, 3, 4}, respectively. The value of gcmp_packing_type shall be in the range of 0 to 5, inclusive. Other values for gcmp_packing_type are reserved for future use.

As shown in FIG. 4, when the syntax element gcmp_packing_type is set by 0 and the syntax element gcmp_guard_band_boundary_exterior_flag is set by 0 under a condition that the syntax element gcmp_guard_band_flag is set by 1, a first guard band is added to a bottom face boundary of a first projection face packed at a face position with the position index n=2, and a second guard band is added to a top face boundary of a second projection face packed at a face position with the position index n=3, where the first guard band and the second guard band have the same guard band size D as specified by gcmp_guard_band_samples_minus1 plus 1. If the bottom face boundary of the first projection face directly connects with the top face boundary of the second projection face, an edge (e.g., a discontinuous edge or a continuous edge) exists between the first projection face and the second projection face. Guard bands can be added to the edge between the first projection face and the second projection face. For example, regarding a cube in a 3D space, the bottom face boundary of the first projection face (which is one square face of the cube) may be connected with or may not be connected with the top face boundary of the second projection face (which is another square face of the cube); and regarding a cube-based projection layout on a 2D plane, the bottom face boundary of the first projection face is parallel with the top face boundary of the second projection face, and the first guard band and the second guard band are both between the first projection face and the second projection face for isolating the bottom face boundary of the first projection face from the top face boundary of the second projection face, where the first guard band connects with the bottom face boundary of the first projection face and the second guard band, and the second guard band connects with the first guard band and the top face boundary of the second projection face. Hence, the width of one guard band area (which consists of the first guard band and the second guard) inserted between the first projection face (which is packed at the face position with the position index n=2) and the second projection face (which is packed at the face position with the position index n=3) is equal to 2*D.

As shown in FIG. 4, when the syntax element gcmp_packing_type is set by 0 and the syntax element gcmp_guard_band_boundary_exterior_flag is set by 1 under a condition that the syntax element gcmp_guard_band_flag is set by 1, a first guard band is added to a bottom face boundary of a projection face packed at a face position with the position index n=2, a second guard band is added to a top face boundary of a projection face packed at a face position with the position index n=3, a third guard band is added to a top face boundary of a projection face packed at a face position with the position index n=0, a fourth guard band is added to a bottom face boundary of a projection face packed at a face position with the position index n=5, a fifth guard band is added to left face boundaries of projection faces packed at face positions with the position indexes n=0-5, and a sixth guard band is added to right face boundaries of projection faces packed at face positions with the position indexes n=0-5, where the first guard band, the second guard band, the third guard band, the fourth guard band, the fifth guard band, and the sixth guard band have the same guard band size D as specified by gcmp_guard_band_samples_minus1 plus 1. Specifically, the third guard band, the fourth guard band, the fifth guard band, and the sixth guard band act as boundaries of the cube-based projection layout. In addition, the width of one guard band area (which consists of two guard bands) inserted between two projection faces (which are packed at face positions with position indexes n=2 and n=3) is equal to 2*D.

Since a person skilled in the art can readily understand details of other guard band configurations shown in FIG. 5 and FIG. 6 after reading above paragraphs, further description is omitted here for brevity.

Furthermore, a syntax element gcmp_face_index[n] may specify a face index for a position index n under a packing type specified by the syntax element gcmp_packing_type. Taking the regular cubemap projection for example, the front face may be assigned with a face index gcmp_face_index[n]==0, the back face may be assigned with a face index gcmp_face_index[n]==1, the top face may be assigned with a face index gcmp_face_index[n]==2, the bottom face may be assigned with a face index gcmp_face_index[n]==3, the right face may be assigned with a face index gcmp_face_index[n]==4, and the left face may be assigned with a face index gcmp_face_index[n]==5. When the syntax element gcmp_packing_type is set by 0, 1, 2, or 3, the syntax element gcmp_face_index[n] specifies a face index of a projection face (e.g., front face "0", back face "1", top face "2", bottom face "3", right face "4", or left face "5" shown in FIG. 2), where the projection face with the face index specified by the syntax element gcmp_face_index[n] is packed at a face position with the position index n under the selected packing type.

Taking the hemisphere cubemap projection for example, the front full/half face may be assigned with a face index gcmp_face_index[n]==0, the back full/half face may be assigned with a face index gcmp_face_index[n]==1, the top full/half face may be assigned with a face index gcmp_face_index[n]==2, the bottom full/half face may be assigned with a face index gcmp_face_index[n]==3, the right full/half face may be assigned with a face index gcmp_face_index[n]==4, and the left full/half face may be assigned with a face index gcmp_face_index[n]==5. When the syntax element gcmp_packing_type is set by 4 or 5, the syntax element gcmp_face_index[n] specifies a face index of a projection face (e.g., front face "0", back face "1", top face "2", bottom face "3", right face "4", or left face "5" shown in FIG. 3), where the projection face with the face index specified by the syntax element gcmp_face_index[n] is packed at a face position with the position index n under the selected packing type.

In addition, the syntax element gcmp_face_rotation[n] specifies a rotation with a rotation angle that is applied to the projection face packed at the face position with the position index n under the packing type specified by the syntax element gcmp_packing_type. For example, when a rotation angle of rotation applied to the projection face to be packed at the face position with the position index n is 0°, the syntax element gcmp_face_rotation[n] is set by 0; when the rotation angle of rotation applied to the projection face to be packed at the face position with the position index n is 90° anti-clockwise, the syntax element gcmp_face_rotation[n] is set by 1; when the rotation angle of rotation applied to the projection face to be packed at the face position with the position index n is 180° anticlockwise, the syntax element gcmp_face_rotation[n] is set by 2; and when the rotation angle of rotation applied to the projection face to be packed at the face position with the position index n is 270° anticlockwise, the syntax element gcmp_face_rotation[n] is set by 3.

After the syntax element(s) SE' are parsed from the bitstream BS, the graphical rendering circuit 124 can refer to the signalled information to do computation for certain applications. For example, the signalled information is involved in a cube-based projection remapping process that is performed at the conversion circuit 125 for remapping sample locations of a projection-based frame on a 2D plane to a sphere in a 3D space via cube-based projection (e.g., cubemap projection or hemisphere cubemap projection).

Figure 7:
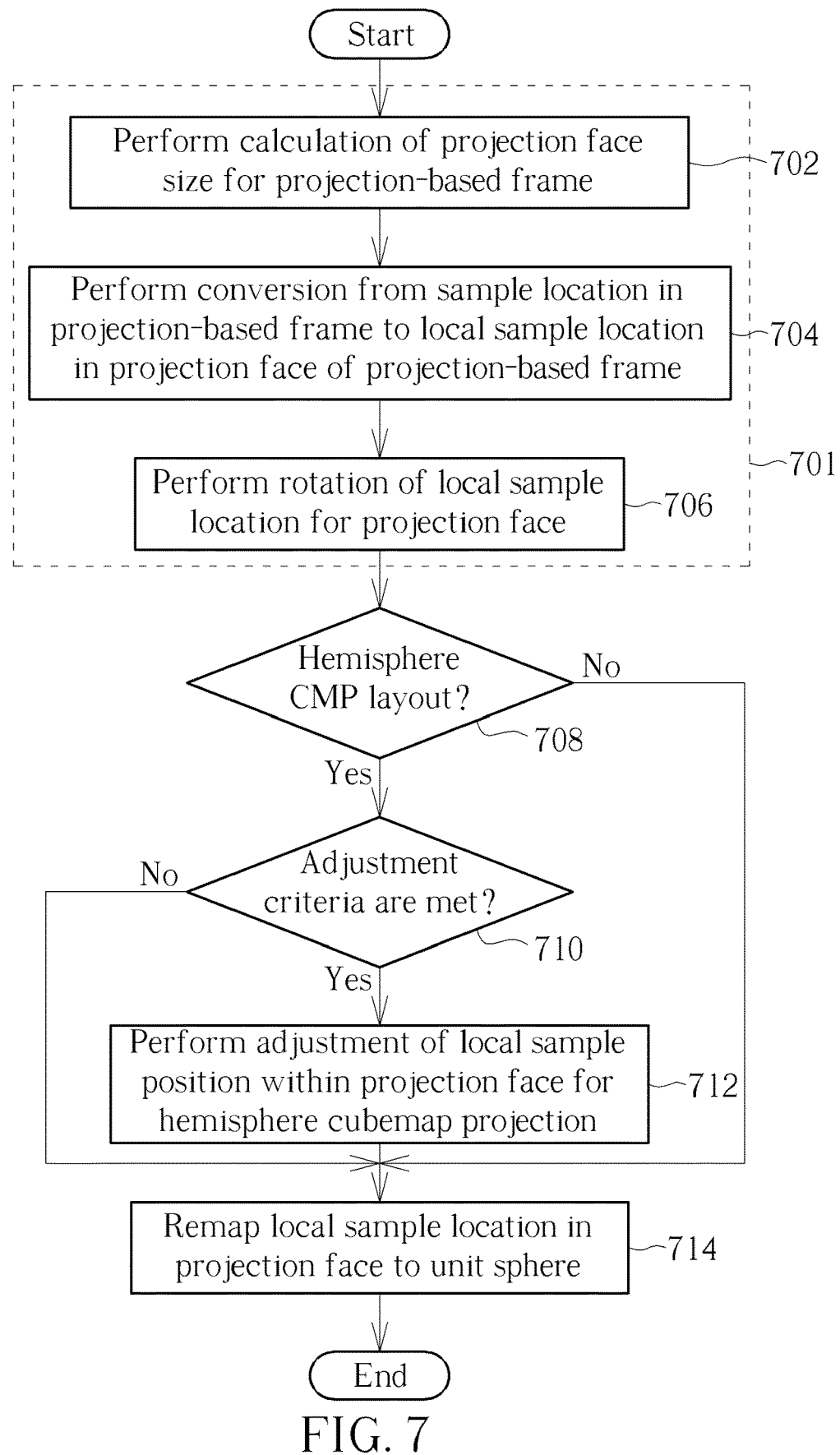
FIG. 7 is a flowchart illustrating a cube-based projection remapping method according to an embodiment of the present invention.

FIG. 7 is a flowchart illustrating a cube-based projection remapping method according to an embodiment of the present invention. The cube-based projection remapping method may be employed by the conversion circuit 125 for applying 2D-to-3D remapping to sample locations. Provided that the result is substantially the same, the steps are not required to be executed in the exact order shown in FIG. 7. After the video decoder 122 decodes a part of the bitstream BS to generate the decoded frame IMG' that is a projection-based frame having a plurality of projection faces packed in a cube-based projection layout (e.g., CMP layout or hemi-sphere CMP layout) with guard bands or a cube-based projection layout (e.g., CMP layout or hemisphere CMP layout) without guard bands, the graphic render circuit 124 (particularly, conversion circuit 125) may remap sample locations of the projection-based frame IMG' on a 2D plane to locations on the sphere 200 in a 3D space for determining an image content of a viewport area selected by a user. At step 701, the conversion circuit 125 converts a sample location within the projection-based frame IMG' into a local sample location within a projection face packed in the projection-based frame IMG'. In this embodiment, step 701 may be subdivided into steps 702, 704, and 706.

At step 702, the conversion circuit 125 performs calculation of a projection face size for the projection-based frame IMG'. As mentioned above, the syntax element gcmp_guard_band_samples_minus1 is arranged to provide size information of each guard band packed in the projection-based frame (e.g., IMG or IMG'). In some embodiments of the present invention, the decoder-side conversion circuit 125 may refer to syntax elements gcmp_packing_type, gcmp_guard_band_flag, gcmp_guard_band_boundary_exterior_flag, and gcmp_guard_band_samples_minus1 parsed from the bitstream BS to do calculation of the cubemap face size for the projection-based frame IMG' under one of the guard band configurations shown in FIGS. 4-6. Inputs of this process may include width pictureWidth and height pictureHeight of the projection-based frame IMG'. Outputs of this process may include width faceWidth and height faceHeight of a projection face (full face) packed in the projection-based frame IMG'.

The outputs may be derived as follows:
gcmpPicWidth=pictureWidth
gcmpPicHeight=pictureHeight
gcmpGuardBandSamples=gcmp_guard_band_flag ? gcmp_guard_band_samples_minus1+1:0
if (gcmp_guard_band_flag && gcmp_guard_band_boundary_exterior_flag) {
  gcmpPicWidth=pictureWidth−2*gcmpGuardBandSamples
  gcmpPicHeight=pictureHeight−2*gcmpGuardBandSamples
}
if (gcmp_packing_type==0) {
  if (gcmp_guard_band_flag) {
    gcmpPicHeight=gcmpPicHeight−2*gcmpGuardBandSamples
  }
  faceWidth=gcmpPicWidth
  faceHeight=gcmpPicHeight/6
} else if (gcmp_packing_type==1) {
  if (gcmp_guard_band_flag) {
    gcmpPicWidth=gcmpPicWidth−2*gcmpGuardBandSamples
  }
  faceWidth=gcmpPicWidth/2
  faceHeight=gcmpPicHeight/3
} else if (gcmp_packing_type==2) {
  if (gcmp_guard_band_flag) {
    gcmpPicHeight=gcmpPicHeight−2*gcmpGuardBandSamples
  }
  faceWidth=gcmpPicWidth/3
  faceHeight=gcmpPicHeight/2
} else if (gcmp_packing_type==3) {
  if (gcmp_guard_band_flag) {
    gcmpPicWidth=gcmpPicWidth−2*gcmpGuardBandSamples
  }
  faceWidth=gcmpPicWidth/6
  faceHeight=gcmpPicHeight
} else if (gcmp_packing_type==4) {
  if (gcmp_guard_band_flag) {
    gcmpPicWidth=gcmpPicWidth−2*gcmpGuardBandSamples
  }
  faceWidth=gcmpPicWidth/3
  faceHeight=gcmpPicHeight
} else if (gcmp_packing_type==5) {
  if (gcmp_guard_band_flag) {
    gcmpPicHeight=gcmpPicHeight−2*gcmpGuardBandSamples
  }
  faceWidth=gcmpPicWidth
  faceHeight=gcmpPicHeight/3
}

It should be noted that, when the 360 VR projection layout L_VR is set by a CMP layout (i.e., gcmp_packing_type is equal to 0, 1, 2, or 3), one output faceWidth represents a face width of each face packed in the projection-based frame IMG', and another output faceHeight represents a face height of each face packed in the projection-based frame IMG'; and when the 360 VR projection layout L_VR is set by a hemisphere CMP layout (i.e., gcmp_packing_type is equal to 4 or 5), one output faceWidth represents a face width of a full face packed in the projection-based frame IMG', and another output faceHeight represents a face height of the full face packed in the projection-based frame IMG'. It should also be noted that faceWidth may be the same as faceHeight.

At step 704, the conversion circuit 125 performs conversion from a sample location in a projection-based frame to a local sample location in a projection face of the projection-based frame. Inputs of this process may include width faceWidth and height faceHeight that are obtained at step 702, and may further include a sample location (hPos, vPos) of the projection-based frame IMG'. An output of this process may include a local sample location (hPosFace, vPosFace) of a projection face packed in the projection-based frame IMG'.

The output may be derived as follows:
gbSize=gcmpGuardBandSamples
tmpHorPos=hPos
tmpVerPos=vPos
if (gcmp_guard_band_flag) {
  if (gcmp_guard_band_boundary_exterior_flag) {
  tmpHorPos=hPos-gbSize
  tmpVerPos=vPos-gbSize
  }
  if (gcmp_packing_type==0)
  tmpVerPos=tmpVerPos<3*faceHeight ? tmpVerPos: tmpVerPos-2*gbSize
  else if (gcmp_packing_type==1)
  tmpHorPos=tmpHorPos<faceWidth ? tmpHorPos:tmpHorPos-2*gbSize
  else if (gcmp_packing_type==2)
  tmpVerPos=tmpVerPos<faceHeight ? tmpVerPos: tmpVerPos-2*gbSize
  else if (gcmp_packing_type==3)
  tmpHorPos=tmpHorPos<3*faceWidth ? tmpHorPos:tmpHorPos-2*gbSize
  else if (gcmp_packing_type==4)
  tmpHorPos=tmpHorPos<faceWidth/2 ? tmpHorPos: tmpHorPos<2.5*faceWidth+gbSize ? tmpHorPos-gbSize:tmpHorPos-2*gbSize
  else if (gcmp_packing_type==5)
  tmpVerPos=tmpVerPos<faceHeight/2 ? tmpVerPos: tmpVerPos<2.5*faceHeight+gbSize ? tmpVerPos-gbSize:tmpVerPos-2*gbSize
}
w=Floor (tmpHorPos÷faceWidth)
h=Floor (tmpVerPos÷faceHeight)
hPosFace=tmpHorPos-w*faceWidth
vPosFace=tmpVerPos-h*faceHeight At step 706, the conversion circuit 125 performs rotation of a local sample location for a projection face. The rotation information specified by the the syntax element gcmp_face_rotation may be involved in rotation of a local sample location within one of the projection faces. Inputs of the rotation process may include width faceWidth and height faceHeight of a projection face to be rotated, and may further include a conversion result of step 704, that is, a sample location (hPosFace, vPosFace) within the projection face on a 2D plane; and an output of the rotation process may include a rotated local sample location (hPosRot, vPosRot) within the projection face on the 2D plane.

The output may be derived as follows:
If (gcmp_face_rotation[n]==0) {
  hPosRot=hPosFace
  vPosRot=vPosFace
} else if (gcmp_face_rotation[n]==1) {
  hPosRot=vPosFace
  vPosRot=faceWidth-hPosFace
} else if (gcmp_face_rotation[n]==2) {
  hPosRot=faceWidth-hPosFace
  vPosRot=faceHeight-vPosFace
} else if (gcmp_face_rotation[n]==3) {
  hPosRot=faceHeight-vPosFace
  vPosRot=hPosFace
}

It should be noted that when a rotation angle of rotation applied to a projection face with the position index n is 0°, an output local sample location (hPosRot, vPosRot) obtained by step 706 is the same as an input sample location (hPosFace, vPosFace) in the projection face with the position index n.

At step 708, the conversion circuit 215 determines if the 360 VR projection layout L_VR is set by a hemisphere CMP layout (i.e., gcmp_packing_type is equal to 4 or 5). If yes, the flow proceeds with step 710. If no, the flow proceeds with step 714. At step 710, the conversion circuit 125 determines if adjustment criteria are met. If yes, the flow proceeds with step 712. If no, the flow proceeds with step 714. At step 712, the conversion circuit 125 performs adjustment of a local sample location within a projection face for hemisphere cubemap projection.

Figure 8:
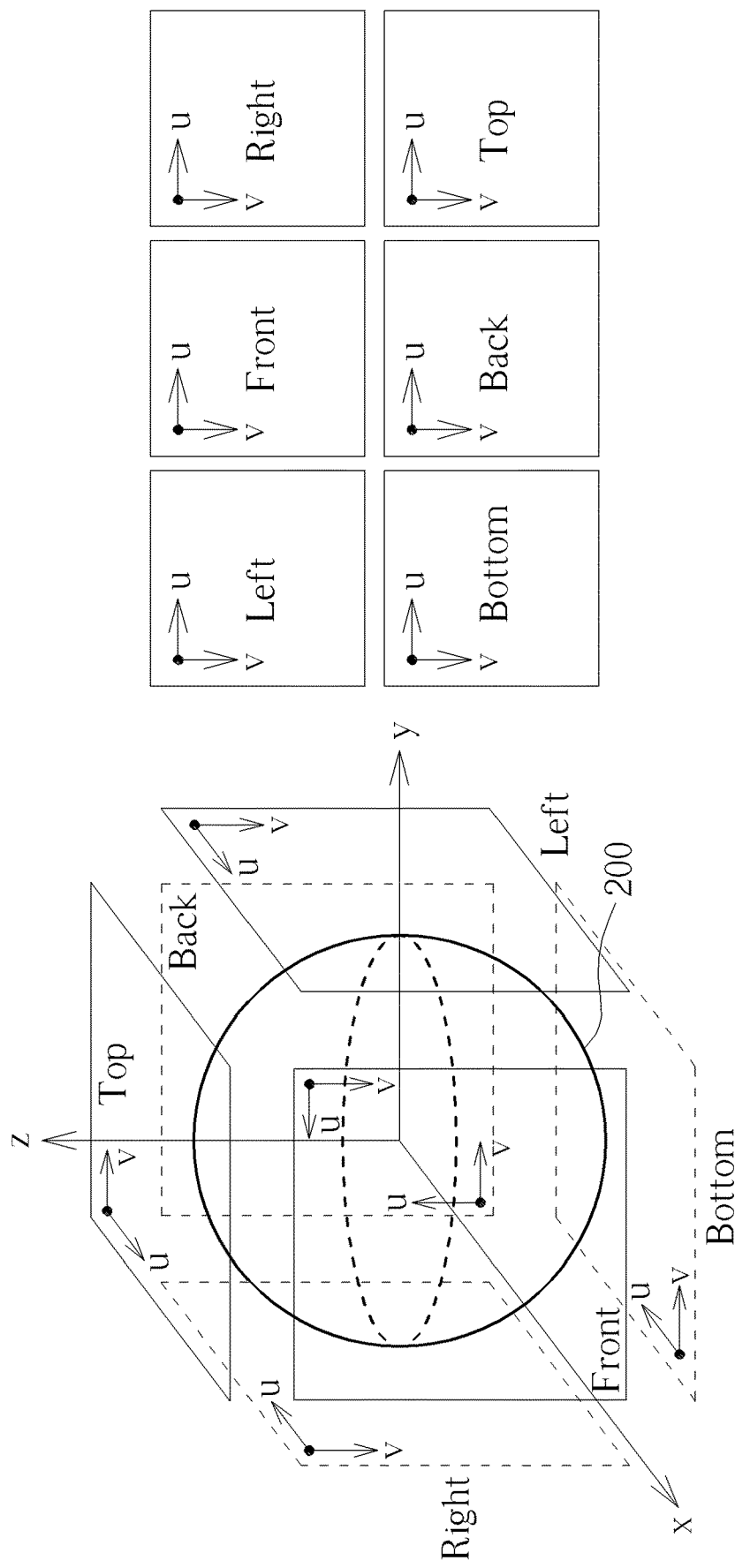
FIG. 8 is a diagram illustrating the coordinate definition according to an embodiment of the present invention.

With regard to adjustment of a local sample location within a projection face for hemisphere cubemap projection, the used coordinate definition is illustrated in FIG. 8, where the viewing perspective is from an origin of the sphere 200 looking outward toward the inside of the sphere 200. Each of the projection faces respectively derived from square faces of a cube in the 3D space is located on one 2D plane defined by u-axis and v-axis, and has each local sample location located at (u, v) within the projection face with an origin of coordinates illustrated in FIG. 8.

As mentioned above, the full face packed in the hemisphere CMP layout may be any of the top face, the bottom face, the front face, the back face, the left face, and the right face, and the four half faces packed in the hemisphere CMP layout depend on the selection of the full face. A half face to be packed in the hemisphere CMP layout may be a left half face, a right half face, a top half face, or a bottom half face, depending upon the selection of the full face to be packed in the hemisphere CMP layout and the spatial relation between the full face and the half face.

FIG. 9 is a diagram illustrating an example of four half faces selected for the hemisphere CMP layout under a condition that the front face is selected as the full face. In accordance with the coordinate definition illustrated in FIG. 8, the four half faces in the hemisphere CMP layout include a right half of the left face, a left half of the right face, a right half of the top face, and a left half of the bottom face.

FIG. 10 is a diagram illustrating an example of four half faces selected for the hemisphere CMP layout under a condition that the back face is selected as the full face. In accordance with the coordinate definition illustrated in FIG. 8, the four half faces in the hemisphere CMP layout include a left half of the left face, a right half of the right face, a left half of the top face, and a right half of the bottom face.

Figure 11:
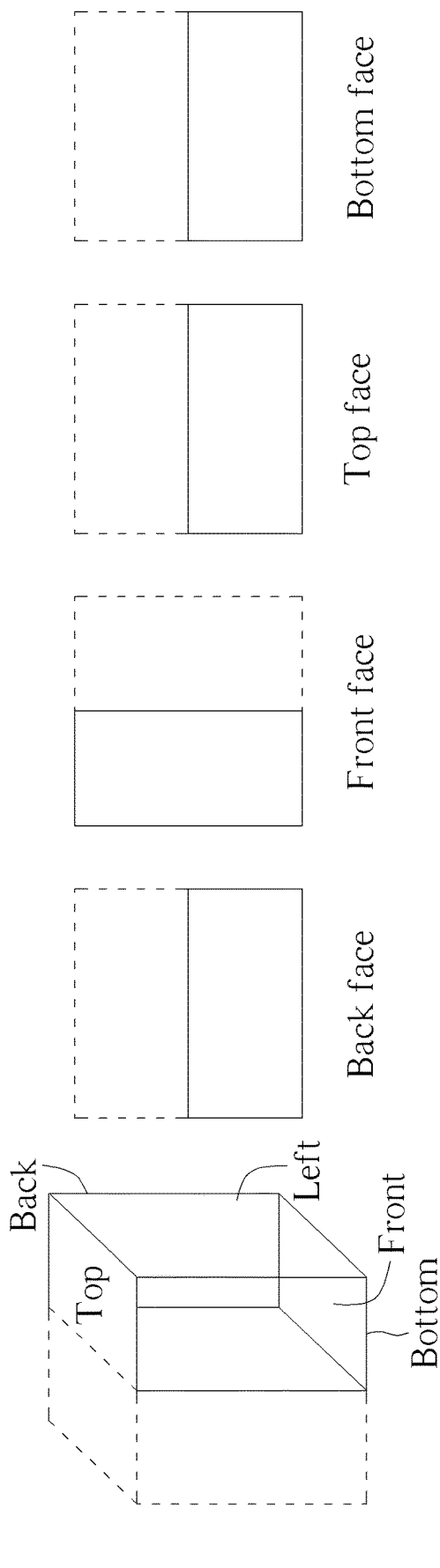
FIG. 11 is a diagram illustrating an example of four half faces selected for the hemisphere CMP layout under a condition that the left face is selected as the full face.

FIG. 11 is a diagram illustrating an example of four half faces selected for the hemisphere CMP layout under a condition that the left face is selected as the full face. In accordance with the coordinate definition illustrated in FIG.

8, the four half faces in the hemisphere CMP layout include a bottom half of the back face, a left half of the front face, a bottom half of the top face, and a bottom half of the bottom face.

Figure 12:
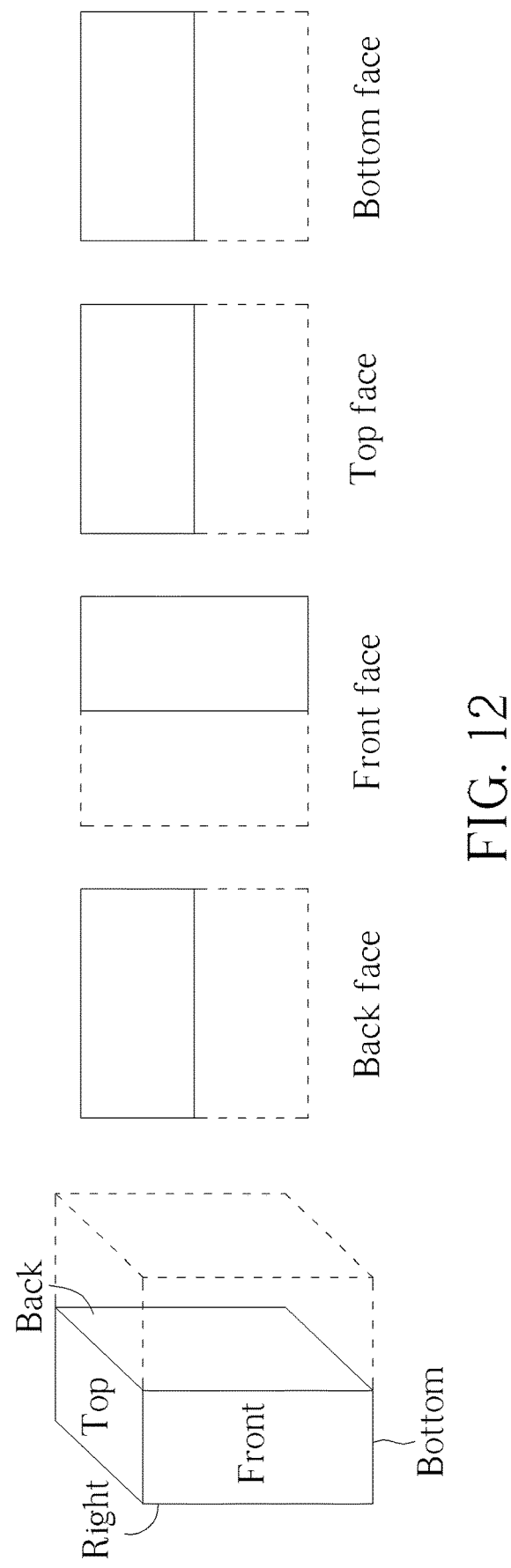
FIG. 12 is a diagram illustrating an example of four half faces selected for the hemisphere CMP layout under a condition that the right face is selected as the full face.

FIG. 12 is a diagram illustrating an example of four half faces selected for the hemisphere CMP layout under a condition that the right face is selected as the full face. In accordance with the coordinate definition illustrated in FIG. 8, the four half faces in the hemisphere CMP layout include a top half of the back face, a right half of the front face, a top half of the top face, and a top half of the bottom face.

FIG. 13 is a diagram illustrating an example of four half faces selected for the hemisphere CMP layout under a condition that the top face is selected as the full face. In accordance with the coordinate definition illustrated in FIG. 8, the four half faces in the hemisphere CMP layout include a top half of the left face, a top half of the front face, a right half of the back face, and a top half of the right face.

FIG. 14 is a diagram illustrating an example of four half faces selected for the hemisphere CMP layout under a condition that the bottom face is selected as the full face. In accordance with the coordinate definition illustrated in FIG. 8, the four half faces in the hemisphere CMP layout include a bottom half of the left face, a bottom half of the front face, a left half of the back face, and a bottom half of the right face.

At step 704, the local sample location (hPosFace, vPosFace) is calculated on the basis of the face width faceWidth and the face height faceHeight of one projection face being a full face. At step 706, the local sample location (hPosRot, vPosRot) is calculated on the basis of the face width faceWidth and/or the face height faceHeight of one projection face being a full face, if non-zero rotation is applied (i.e., gcmp_face_rotation is equal to 1, 2, or 3). However, regarding the hemisphere CMP layout that is employed as the 360 VR projection layout L_VR, not all of the projection faces packed in the projection-based frame IMG' are full faces each having the face width faceWidth and the face height faceHeight. Hence, it is possible that a local sample location calculated and output by step 701 (e.g., the local sample location (hPosRot, vPosRot) within a half face that is converted from the sample location (hPos, vPos) within the projection-based frame IMG') is deviated from an actual local sample location by an offset value (e.g., faceWidth/2) in a horizontal direction or an offset value (e.g., faceHeight/2) in a vertical direction. The non-zero location deviation (e.g., faceWidth/2 or faceHeight/2) may be introduced by one or both of steps 704 and 706.

Figure 15:
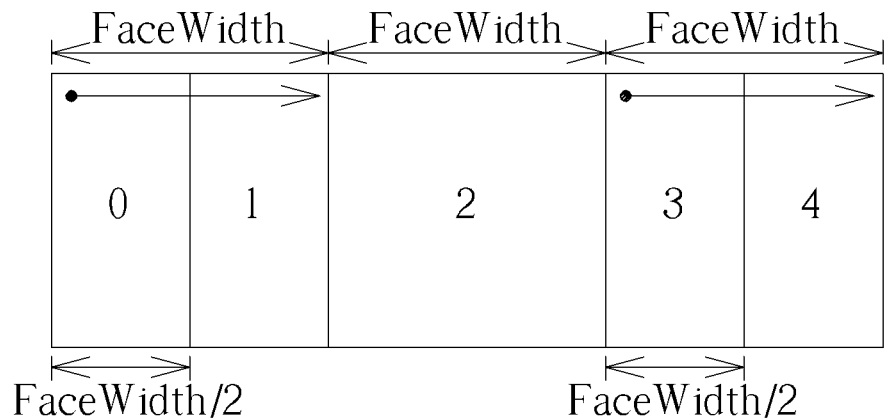
FIG. 15 is a diagram illustrating distribution of sample locations within half faces in one hemisphere CMP layout (gcmp_packing_type==4) that are calculated and output from step 704.

FIG. 15 is a diagram illustrating distribution of sample locations within half faces in one hemisphere CMP layout (gcmp_packing_type==4) that are calculated and output from step 704. Regarding a half face packed at a face position with a position index n=0, all local sample locations (hPosFace, vPosFace) output from step 704 have u-axis (horizontal) coordinate values hPosFace in a range {0, (faceWidth/2)−1}. Regarding a half face packed at a face position with a position index n=1, all local sample locations (hPosFace, vPosFace) output from step 704 have u-axis (horizontal) coordinate values hPosFace in a range {faceWidth/2, faceWidth−1}. Regarding a half face packed at a face position with a position index n=3, all local sample locations (hPosFace, vPosFace) output from step 704 have u-axis (horizontal) coordinate values hPosFace in a range {0, (faceWidth/2)−1}. Regarding a half face packed at a face position with a position index n=4, all local sample locations (hPosFace, vPosFace) output from step 704 have u-axis (horizontal) coordinate values hPosFace in a range {faceWidth/2, faceWidth−1}.

Figure 16:
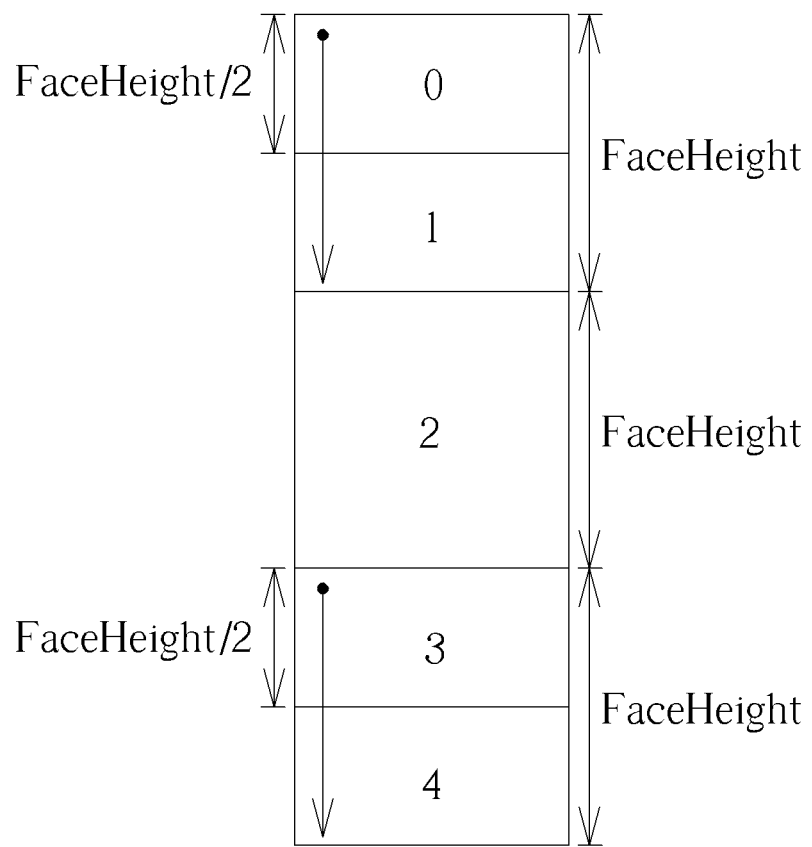
FIG. 16 is a diagram illustrating distribution of sample locations within half faces in another hemisphere CMP layout (gcmp_packing_type==5) that are calculated and output from step 704.

FIG. 16 is a diagram illustrating distribution of sample locations within half faces in another hemisphere CMP layout (gcmp_packing_type==5) that are calculated and output from step 704. Regarding a half face packed at a face position with a position index n=0, all local sample locations (hPosFace, vPosFace) output from step 704 have v-axis (vertical) coordinate value vPosFace in a range {0, (faceHeight/2)−1}. Regarding a half face packed at a face position with a position index n=1, all local sample locations (hPosFace, vPosFace) output from step 704 have v-axis (vertical) coordinate values vPosFace in a range {faceHeight/2, faceHeight−1}. Regarding a half face packed at a face position with a position index n=3, all local sample locations (hPosFace, vPosFace) output from step 704 have v-axis (vertical) coordinate values vPosFace in a range {0, (faceHeight/2)−1}. Regarding a half face packed at a face position with a position index n=4, all local sample locations (hPosFace, vPosFace) output from step 704 have v-axis (vertical) coordinate values vPosFace in a range {faceHeight/2, faceHeight−1}.

If zero rotation is employed for a face position n at step 706 (i.e., gcmp_face_rotation[n]==0), local sample locations (hPosRot, vPosRot) within a face packed at the face position n that are calculated and output from step 706 are identical to local sample locations (hPosFace, vPosFace) within the face packed at the face position n that are calculated and output from step 704. Regarding a conversion result generated for the face packed at the face position n, local sample locations (hPosRot, vPosRot) output from step 706 are kept in an aforementioned range in the horizontal direction (gcmp_packing_type==4) or the vertical direction (gcmp_packing_type==5). Hence, either a zero location deviation or a non-zero location deviation introduced to a local sample location within the face at step 704 remains unchanged at step 706.

If non-zero rotation is employed for a face position n at step 706 (i.e., gcmp_face_rotation[n]==1, 2, or 3), local sample locations (hPosRot, vPosRot) within a face packed at the face position n that are calculated and output from step 706 are different from local sample locations (hPosFace, vPosFace) within the face packed at the face position n that are calculated and output from step 704. Regarding a conversion result generated for the face packed at the face position n, it is possible that local sample locations (hPosRot, vPosRot) output from step 706 are out of the aforementioned range in the horizontal direction (gcmp_packing_type==4) or the vertical direction (gcmp_packing_type==5). Hence, either a zero location deviation or a non-zero location deviation that is introduced to a local sample position within the face at step 704 may be changed at step 706 due to the applied rotation with a non-zero rotation angle. For example, a zero location deviation that is introduced to a local sample position within the face at step 704 may be changed to a non-zero location deviation by the non-zero rotation performed at step 706. For another example, a non-zero location deviation that is introduced to a local sample position within the face at step 704 may be changed to a zero location deviation by the non-zero rotation performed at step 706.

As shown in FIGS. 9-14, when a left half of a square face of a cube is used to set a half face packed in the hemisphere CMP layout, u-axis (horizontal) coordinate values hPosRot of sample locations within the half face should not exceed faceWidth/2 (which is a half of a face width of the full face packed in the hemisphere CMP layout). Hence, an u-axis (horizontal) coordinate value of a half face's sample location calculated and output from step 701 should be further adjusted when adjustment criteria are met due to the fact that the u-axis (horizontal) coordinate value is not smaller than faceWidth/2 and a left half of a square face of a cube is used to set the half face. For example, an offset value (e.g., faceWidth/2) may be subtracted from the u-axis (horizontal) coordinate value.

When a right half of a square face of a cube is used to set a half face packed in the hemisphere CMP layout, u-axis (horizontal) coordinate values hPosRot of sample locations within the half face should exceed faceWidth/2 (which is a half of a face width of the full face packed in the hemisphere CMP layout). Hence, an u-axis (horizontal) coordinate value of a half face's sample location calculated and output from step 701 should be further adjusted when the adjustment criteria are met due to the fact that the u-axis (horizontal) coordinate value is smaller than faceWidth/2 and a right half of a square face of a cube is used to set the half face. For example, an offset value (e.g., faceWidth/2) may be added to the u-axis (horizontal) coordinate value.

When a top half of a square face of a cube is used to set a half face packed in the hemisphere CMP layout, v-axis (vertical) coordinate values vPosRot of sample locations within the half face should not exceed faceHeight/2 (which is a half of a face height of the full face packed in the hemisphere CMP layout). Hence, a v-axis (vertical) coordinate value of a half face's sample location calculated and output from step 701 should be further adjusted when the adjustment criteria are met due to the fact that the v-axis (vertical) coordinate value is not smaller than faceHeight/2 and a top half of a square face of a cube is used to set the half face. For example, an offset value (e.g., faceHeight/2) may be subtracted from the v-axis (vertical) coordinate value.

When a bottom half of a square face of a cube is used to set a half face packed in the hemisphere CMP layout, v-axis (vertical) coordinate values vPosRot of sample locations within the half face should exceed faceHeight/2 (which is a half of a face height of the full face packed in the hemisphere CMP layout). Hence, a v-axis (vertical) coordinate value of a half face's sample location calculated and output from step 701 should be further adjusted when the adjustment criteria are met due to the fact that the v-axis (vertical) coordinate value is smaller than faceHeight/2 and a bottom half of a square face of a cube is used to set the half face. For example, an offset value (e.g., faceHeight/2) may be added to the v-axis (vertical) coordinate value.

To put it simply, the conversion circuit 125 checks if adjustment criteria are met (step 710); and in response to the adjustment criteria being met, the conversion circuit 125 generates an adjusted local sample location within a projection face by applying adjustment to one of a first coordinate value and a second coordinate value of a local sample location within the projection face, where the first coordinate value is on a first axis and the second coordinate value is on a second axis. Inputs of the adjustment process may include width faceWidth and height faceHeight of a projection face (full face), and may further include a conversion result of step 701, that is, a rotated local sample location (hPosRot, vPosRot) within a projection face on a 2D plane; and an output of the adjustment process may include an adjusted local sample location (hPosAdj, vPosAdj) within the projection face on the 2D plane.

The output may be derived as follows:
leftFaceIdx={5, 3, 1, 0, 0, 1}
rightFaceIdx={4, 2, 0, 1, 1, 0}
topFaceIdx={2, 4, 4, 4, 2, 2}
bottomFaceIdx={3, 5, 5, 5, 3, 3}
hPosAdj=hPosRot
vPosAdj=vPosRot
if(n !=2){
  if(gcmp_face_index[2]==leftFaceIdx [gcmp_face_index[n]] && hPosAdj>=faceWidth/2)
    hPosAdj-=faceWidth/2
  else if(gcmp_face_index[2]==rightFaceIdx [gcmp_face_index[n]] && hPosAdj<faceWidth/2)
    hPosAdj+=faceWidth/2
  else if(gcmp_face_index[2]==topFaceIdx [gcmp_face_index[n]] && vPosAdj>=faceHeight/2)
    vPosAdj-=faceHeight/2
  else if(gcmp_face_index[2]==bottomFaceIdx [gcmp_face_index[n]] && vPosAdj<faceHeight/2)
    vPosAdj+=faceHeight/2

Suppose that a current half face to be processed is packed at a face position with a position index n (n≠2). In a case where a face index of the current half face is 0 (i.e., gcmp_face_index[n]=0), meaning that the current half face is a half front face, index values including leftFaceIdx[0]=5, rightFaceIdx[0]=4, topFaceIdx[0]=2, and bottomFaceIdx [0]=3 are compared with a face index of a full face packed at a face position with a position index n=2.

If gcmp_face_index[2] is found equal to 5 (gcmp_face_index[2]==leftFaceIdx[0]), it indicates that the current half face (which is a half front face) is derived from a left part of the front face under the selection of the full face being the left face. Hence, the criterion hPosAdj>=faceWidth/2 is checked to determine if an offset value (e.g., faceWidth/2) should be subtracted from a horizontal coordinate value of the local sample location.

If gcmp_face_index[2] is equal to 4 (gcmp_face_index [2]==rightFaceIdx[0]), it indicates that the current half face (which is a half front face) is derived from a right part of the front face under the selection of the full face being the right face. Hence, the criterion hPosAdj<faceWidth/2 is checked to determine if an offset value (e.g., faceWidth/2) should be added to a horizontal coordinate value of the local sample location.

If gcmp_face_index[2] is equal to 2 (gcmp_face_index [2]==topFaceIdx[0]), it indicates that the current half face (which is a half front face) is derived from a top part of the front face under the selection of the full face being the top face. Hence, the criterion vPosAdj>=faceHeight/2 is checked to determine if an offset value (e.g., faceHeight/2) should be subtracted from a vertical coordinate value of the local sample location.

If gcmp_face_index[2] is equal to 3 (gcmp_face_index [2]==bottomFaceIdx[0]), it indicates that the current half face (which is a half front face) is derived from a bottom part of the front face under the selection of the full face being the bottom face. Hence, the criterion vPosAdj<faceHeight/2 is checked to determine if an offset value (e.g., faceHeight/2) should be added to a vertical coordinate value of the local sample location.

In another case where a face index of the current half face is 1 (i.e., gcmp_face_index[n]=1), meaning that the current half face is a half back face, index values including leftFaceIdx[1]=3, rightFaceIdx[1]=2, topFaceIdx[1]=4, and bottomFaceIdx[1]=5 are compared with a face index of a full face packed at a face position with a position index n=2.

If gcmp_face_index[2] is equal to 3 (gcmp_face_index [2]==leftFaceIdx[1]), it indicates that the current half face (which is a half back face) is derived from a left part of the back face under the selection of the full face being the bottom face. Hence, the criterion hPosAdj>=faceWidth/2 is checked to determine if an offset value (e.g., faceWidth/2) should be subtracted from a horizontal coordinate value of the local sample location.

If gcmp_face_index[2] is equal to 2 (gcmp_face_index[2]==rightFaceIdx[1]), it indicates that the current half face (which is a half back face) is derived from a right part of the back face under the selection of the full face being the top face. Hence, the criterion hPosAdj<faceWidth/2 is checked to determine if an offset value (e.g., faceWidth/2) should be added to a horizontal coordinate value of the local sample location.

If gcmp_face_index[2] is equal to 4 (gcmp_face_index[2]==topFaceIdx[1]), it indicates that the current half face (which is a half back face) is derived from a top part of the back face under the selection of the full face being the right face. Hence, the criterion vPosAdj>=faceHeight/2 is checked to determine if an offset value (e.g., faceHeight/2) should be subtracted from a vertical coordinate value of the local sample location.

If gcmp_face_index[2] is equal to 5 (gcmp_face_index[2]==bottomFaceIdx[1]), it indicates that the current half face (which is a half back face) is derived from a bottom part of the back face under the selection of the full face being the left face. Hence, the criterion vPosAdj<faceHeight/2 is checked to determine if an offset value (e.g., faceHeight/2) should be added to a vertical coordinate value of the local sample location.

Since a person skilled in the art can readily understand details associated with processing of half faces with other face indices (e.g., gcmp_face_index[n]=2, 3, 4 and 5, where n≠2) after reading above paragraphs, further description is omitted here for brevity. It should be noted that, if the adjustment criteria are not met, the output of the adjustment process is set by the input of the adjustment process, that is, (hPosAdj, vPosAdj)=(hPosRot, vPosRot).

At step 714, the conversion circuit 125 remaps a local sample location in a projection face to a unit sphere. For example, when the hemisphere CMP layout is used, the conversion circuit 125 remaps a local sample location (hPosAdj, vPosAdj) within a projection face on a 2D plane (i.e., an output of step 712) to a location on the sphere 200 in a 3D space. In addition, the mapping information specified by a syntax element gcmp_mapping_function_type may be involved in the 2D-to-3D remapping process. The syntax element gcmp_mapping_function_type is set to specify the mapping function used to adjust the sample locations of the cube-based projection. The value of gcmp_mapping_function_type shall be in the range of 0 to 2, inclusive. If the syntax element gcmp_mapping_function_type is equal to 0, it indicates that the conventional CMP is used. If the syntax element gcmp_mapping_function_type is equal to 1, it indicates that the equi-angular mapping function is employed to adjust sample locations of all square projection faces. If the syntax element gcmp_mapping_function_type is equal to 2, it indicates that the parameterized mapping function is employed to adjust sample locations of all square projection faces.

Inputs of the 2D-to-3D remapping process may include width faceWidth and height faceHeight of a projection face (full face), and may further include a local sample location (hPosAdj, vPosAdj) of a projection face on a 2D plane, where hPosAdj∈[0,faceWidth] and vPosAdj∈[0,faceHeight]; and a final output of the 2D-to-3D remapping process may include sphere coordinates ($\varphi$, $\theta$) for the sample location in degrees.

When the 2D-to-3D remapping process starts, the following applies:
hPos'=-(2*hPosAdj÷faceWidth)+1, and
vPos'=-(2*vPosAdj÷faceHeight)+1, where hPos',vPos'∈[-1,1].

If gcmp_mapping_function_type is equal to 0, the following applies:
hPos"=hPos', and
vPos"=vPos'.

If gcmp_mapping_function_type is equal to 1, the following applies:
hPos"=tan(hPos'*π+4), and
vPos"=tan(vPos'*π+4).

If gcmp_mapping_function_type is equal to 2, the following applies:
coeffU[n]=(gcmp_function_coeff_u[n]+1)÷128,
coeffV[n]=(gcmp_function_coeff_v[n]+1)÷128,
hPos"=hPos'÷[1+coeffU[n]*(1−gcmp_function_u_affected_by_v_flag[n]*vPos'$^2$)*(1−hPos'$^2$)], and
vPos"=vPos'÷[1+coeffV[n]*(1−gcmp_function_v_affected_by_u_flag[n]*hPos'$^2$)*(1−vPos'$^2$)], where n represents a face position index in the cube-based projection layout, and coefficients of the parameterized mapping function used to adjust the local sample location of the projection face are specified by syntax elements gcmp_function_coeff_u[n], gcmp_function_u_affected_by_v_flag[n], gcmp_function_coeff_v[n], and gcmp_function_v_affected_by_u_flag[n]. Specifically, regarding a sample location (hPosAdj, vPosAdj) of a projection face located at a face position index n in the cube-based projection layout, an adjusted sample location (hPos", vPos") can be obtained by the above parameterized mapping function.

After the adjusted sample location (hPos", vPos") is obtained, the following applies:
If (gcmp_face_index[n]==0) {/*positive×front face*/
  x=1.0,
  y=hPos"
  z=vPos"
} else if (gcmp_face_index[n]==1) {/*negative×back face*/
  x=−1.0
  y=−vPos"
  z=−hPos"
} else if (gcmp_face_index[n]==2) {/*positive z top face*/
  x=−hPos"
  y=−vPos"
  z=1.0
} else if (gcmp_face_index[n]==3) {/*negative z bottom face
  x=hPos"
  y=−vPos"
  z=−1.0
} else if (gcmp_face_index[n]==5) {/*positive y left face*/
  x=−hPos"
  y=1.0
  z=vPos"
} else if (gcmp_face_index[n]==4) {/*negative y right face*/
  x=hPos"
  y=−1.0
  z=vPos" }
$\varphi$=Atan 2(y, x)*180÷π
$\theta$=Asin(z÷$\sqrt{x^2+y^2+z^2}$)*180÷π

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A video processing method comprising:
   decoding a part of a bitstream to generate a decoded frame, wherein the decoded frame is a projection-based frame that comprises a plurality of projection faces in a hemisphere cubemap projection layout, and a portion of a 360-degree content of a sphere is mapped to the plurality of projection faces via hemisphere cubemap projection; and
   remapping, by a conversion circuit, sample locations of the projection-based frame on a two-dimensional (2D) plane to locations on the sphere in a three-dimensional (3D) space, comprising:
      converting a sample location within the projection-based frame into a local sample location within a projection face packed in the projection-based frame, wherein the local sample location within the projection face comprises a first coordinate value on a first axis and a second coordinate value on a second axis;
      checking if adjustment criteria are met;
      in response to the adjustment criteria being met, generating an adjusted local sample location within the projection face by applying adjustment to one of the first coordinate value and the second coordinate value of the local sample location within the projection face, and remapping the adjusted local sample location within the projection face to a location on the sphere; and
      in response to the adjustment criteria not being met, remapping the local sample location within the projection face to a location on the sphere.

2. The video processing method of claim 1, wherein face rotation with a rotation angle is involved in converting the sample location within the projection-based frame into the local sample location within the projection face packed in the projection-based frame.

3. The video processing method of claim 1, wherein the first axis is in a width direction of the projection face, the projection face is a half face of a half of a cube, and checking if the adjustment criteria are met comprises:
   checking if the projection face is derived from a left half of a square face of the cube; and
   checking if the first coordinate value of the local sample location within the projection face is not smaller than a half of a face width of a full face of said half of the cube.

4. The video processing method of claim 3, wherein generating the adjusted local sample location within the projection face comprises:
   subtracting an offset value from the first coordinate value, where the offset value is equal to the half of the face width of the full face.

5. The video processing method of claim 1, wherein the first axis is in a width direction of the projection face, the projection face is a half face of a half of a cube, and checking if the adjustment criteria are met comprises:
   checking if the projection face is derived from a right half of a square face of the cube; and
   checking if the first coordinate value of the local sample location within the projection face is smaller than a half of a face width of a full face of said half of the cube.

6. The video processing method of claim 5, wherein generating the adjusted local sample location within the projection face comprises:
   adding an offset value to the first coordinate value, where the offset value is equal to the half of the face width of the full face.

7. The video processing method of claim 1, wherein the second axis is in a height direction of the projection face, the projection face is a half face of a half of a cube, and checking if the adjustment criteria are met comprises:
   checking if the projection face is derived from a top half of a square face of the cube; and
   checking if the second coordinate value of the local sample location within the projection face is not smaller than a half of a face height of a full face of said half of the cube.

8. The video processing method of claim 7, wherein generating the adjusted local sample location within the projection face comprises:
   subtracting an offset value from the second coordinate value, where the offset value is equal to the half of the face height of the full face.

9. The video processing method of claim 1, wherein the second axis is in a height direction of the projection face, the projection face is a half face of a half of a cube, and checking if the adjustment criteria are met comprises:
   checking if the projection face is a bottom half of a square face of the cube; and
   checking if the second coordinate value of the local sample location within the projection face is smaller than a half of a face height of a full face of said half of the cube.

10. The video processing method of claim 9, wherein generating the adjusted local sample location within the projection face comprises:
    adding an offset value to the second coordinate value, where the offset value is equal to the half of the face height of the full face.

11. A video processing apparatus comprising:
    a decoding circuit, arranged to decode a part of a bitstream to generate a decoded frame, wherein the decoded frame is a projection-based frame that comprises a plurality of projection faces in a hemisphere cubemap projection layout, and a portion of a 360-degree content of a sphere is mapped to the plurality of projection faces via hemisphere cubemap projection; and
    a conversion circuit, arranged to remap sample locations of the projection-based frame on a two-dimensional (2D) plane to locations on the sphere in a three-dimensional (3D) space;
    wherein the conversion circuit converts a sample location within the projection-based frame into a local sample location within a projection face packed in the projection-based frame, where the local sample location within the projection face comprises a first coordinate value on a first axis and a second coordinate value on a second axis; the conversion circuit checks if adjustment criteria are met; in response to the adjustment criteria being met, the conversion circuit generates an adjusted local sample location within the projection face by applying adjustment to one of the first coordinate value and the second coordinate value of the local sample location within the projection face, and the conversion circuit remaps the adjusted local sample location within the projection face to a location on the sphere; and in response to the adjustment criteria not being met, the conversion circuit remaps the local sample location within the projection face to a location on the sphere.

12. The video processing apparatus of claim 11, wherein face rotation with a rotation angle is involved in converting the sample location within the projection-based frame into the local sample location within the projection face packed in the projection-based frame.

13. The video processing apparatus of claim 11, wherein the first axis is in a width direction of the projection face, the projection face is a half face of a half of a cube, and the conversion circuit checks if the adjustment criteria are met by:
 checking if the projection face is derived from a left half of a square face of the cube; and
 checking if the first coordinate value of the local sample location within the projection face is not smaller than a half of a face width of a full face of said half of the cube.

14. The video processing apparatus of claim 13, wherein the conversion circuit generates the adjusted local sample location within the projection face by:
 subtracting an offset value from the first coordinate value, where the offset value is equal to the half of the face width of the full face.

15. The video processing apparatus of claim 11, wherein the first axis is in a width direction of the projection face, the projection face is a half face of a half of a cube, and the conversion circuit checks if the adjustment criteria are met by:
 checking if the projection face is derived from a right half of a square face of the cube; and
 checking if the first coordinate value of the local sample location within the projection face is smaller than a half of a face width of a full face of said half of the cube.

16. The video processing apparatus of claim 15, wherein the conversion circuit generates the adjusted local sample location within the projection face by:
 adding an offset value to the first coordinate value, where the offset value is equal to the half of the face width of the full face.

17. The video processing apparatus of claim 11, wherein the second axis is in a height direction of the projection face, the projection face is a half face of a half of a cube, and the conversion circuit checks if the adjustment criteria are met by:
 checking if the projection face is derived from a top half of a square face of the cube; and
 checking if the second coordinate value of the local sample location within the projection face is not smaller than a half of a face height of a full face of said half of the cube.

18. The video processing apparatus of claim 17, wherein the conversion circuit generates the adjusted local sample location within the projection face by:
 subtracting an offset value from the second coordinate value, where the offset value is equal to the half of the face height of the full face.

19. The video processing apparatus of claim 11, wherein the second axis is in a height direction of the projection face, the projection face is a half face of a half of a cube, and the conversion circuit checks if the adjustment criteria are met by:
 checking if the projection face is a bottom half of a square face of the cube; and
 checking if the second coordinate value of the local sample location within the projection face is smaller than a half of a face height of a full face of said half of the cube.

20. The video processing apparatus of claim 19, wherein the conversion circuit generates the adjusted local sample location within the projection face by:
 adding an offset value to the second coordinate value, where the offset value is equal to the half of the face height of the full face.

* * * * *